United States Patent Office 3,801,518
Patented Apr. 2, 1974

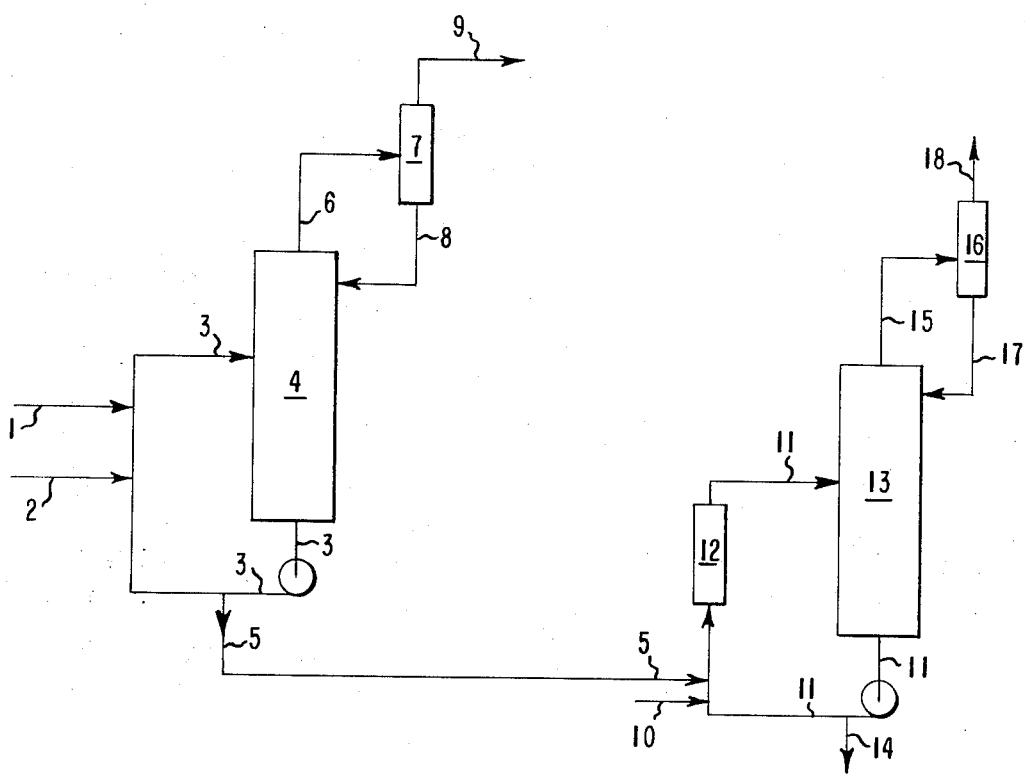

3,801,518
FLEXIBLE POLYURETHANE FOAM HAVING IMPROVED COMPRESSION SET
Carl Francis Irwin, New Castle, and Harry Walter Wolfe, Jr., Newark, Del., assignors to E. I. du Pont de Nemours and Company, Wilmington, Del.
Continuation-in-part of abandoned application Ser. No. 137,142, Apr. 26, 1971. This application Feb. 28, 1972, Ser. No. 230,118
Int. Cl. C08g 22/44, 53/10
U.S. Cl. 260—2.5 AT                     3 Claims

ABSTRACT OF THE DISCLOSURE

Process for producing an improved undistilled tolylene diamine phosgenation product, having an amine equivalent of about 90–125, by mixing tolylene diamine and phosgene at an elevated temperature until the amine is substantially all converted to isocyanate and adjusting the acidity of said undistilled phosgenation product until the acidity of the undistilled product is in the range of about 0.03–0.3 weight percent. The phosgenation product may be used effectively as an element in a highly resilient polyurethane foam.

It is preferred to adjust the acidity of the undistilled product by maintaining said product in a phosgenation atmosphere at a temperature of about 100–200° C. for at least about 0.08 hour, preferably 0.08–2 hours.

RELATED APPLICATIONS

This application is a continuation-in-part of U.S. Ser. No. 137,142, filed Apr. 26, 1971, now abandoned, for Carl F. Irwin and Harry W. Wolfe, Jr.

This invention relates to the production of polyurethane foam and more particularly to improvement of the elastomeric properties of such foam, e.g., compression set, by the use of undistilled tolylene diamine phosgenation product, having particular properties, as an element in the foam.

The invention also relates to a method for preparing the phosgenation product which has these particular properties.

Production of flexible polyurethane foam by reacting undistilled tolylene diisocyanate or undistilled tolylene diamine phosgenation product with polymeric polyol in the presence of catalyst, cross-linking agent, blowing agent, surfactant, and other additives is known in the art.

Flexible polyurethane foam has found extensive use as support material, weight-bearing filler, or energy-absorbing material for cushions, mattresses, padding, seats, and other applications in automotive, household, and office furnishings. Use of such foam in a particular application requires a foam having certain properties. Features such as unit cost, demolding ability, self-curing ability, sag factor, load-bearing factor, flame resistance, and compression set must be evaluated and adjusted for each application.

Ever increasing performance standards, especially for better load-bearing ability and compression set at reasonable unit cost, create the need for foam having improved properties. In applications such as automotive seat cushions where the trend is toward less support of the foam cushions and toward higher load-bearing, more crush resistant foam cushion, there is a need for high resilience foam having good compression set at high deflection for a unit cost comparable with previously used foams.

SUMMARY

It has now been discovered that polyurethane foam having good compression set at high deflection can be produced from an undistilled tolylene diisocyanate whose acidity has been adjusted until it is in the range of about 0.03–0.3 weight percent. This undistilled diisocyanate, which is referred to as crude TDI or undistilled tolylene diamine phosgenation product, consists essentially of undistilled tolylene diamine phosgenation product which has been produced by phosgenating tolylene diamine until substantially all of the amine has been converted to isocyanate. Following this conversion the acidity level of the amine which had previously been somewhere between 0.00 and about 0.02 weight percent is adjusted until a range of about 0.03–0.30 weight percent has been reached. In a much preferred embodiment of this invention the acidity is adjusted to a level of about 0.03–0.3 weight percent by holding the undistilled phosgenation product in a phosgenation atmosphere at a temperature range of about 100–200° C. for a sufficient period to adjust the acidity of the undistilled phosgenation product to the desired range e.g. about 0.03–0.3 weight percent. The needed time to accomplish this should be at least about 0.08 hour and preferably 0.08–2 hours.

It is understood that this invention includes all methods for obtaining the desired acidity level; other methods for obtaining the desired acidity level will be subsequently discussed.

Flexible foams which include the diamine phosgenation product of the instant invention as an element exhibit unexpectedly low compression set values at high deflections, specifically, compression set of less than 35% at 75% deflection is seen and compression set of less than 50% at 90% deflection is also seen.

The unstilled diisocyanate which is utilized in the instant invention can be produced by many different methods which are known in the art.

It is known in the art that typically, the acidity of such undistilled diisocyanates will vary from 0–0.02 weight percent. According to the instant invention this acidity level is adjusted upwardly until a level of 0.03–0.30 weight percent is reached. Specifically, three methods for acidity adjustment are preferred. The first of these methods is termed the "natural process" because it does not require an additional component, the second is the "halide process" because an additional halide component is utilized and finally, the third is a combination of the first two methods.

The natural process is the preferred method of this invention because it can conveniently be used either immediately following the diamine phosgenation or as a continuation of the tolylene diamine phosgenation, with the same or related equipment. This process is also preferred because it merely requires the continuation of the phosgenation process and does not require the addition of another chemical component. In this preferred method, undistilled diisocyanate which is a complex mixture of substantially all phosgenated diamine is held at an effective elevated temperature, preferably 100–200° C., for a sufficient period, which would be at least 0.08 hour and preferably about 0.08–2 hours, in the presence of a phosgenation atmosphere until the acidity of the undistilled diisocyanate is adjusted so that it is at least 0.03 weight percent.

The amine equivalent of the undistilled tolylene diamine phosgenation product is about 90–125.

In an alternative method the acidity adjustment is accomplished by the halide process which comprises adding acid halide to the substantially phosgenated diamine. An effective amount of acid halide is added, that is an amount which is sufficient to raise the acidity to at least 0.03 weight percent and preferably between 0.03 and 0.3 weight percent. The acid halides and phosgenated diamine are mixed at a temperature of about 20–200° C.

and halide in the amount of 0.003–.05 equivalent per 100 grams of phosgenated diamine is utilized.

All of the acid halides may be utilized, e.g. fluorides, chlorides, bromides and iodides as well as the mono-, di- and polyhalides. Polyisocyanates in which the acidity is modified by using di- and polyhalides are generally more effective than polyisocyanates modified with monohalides, in improving the compression set of polyurethane foams and are, therefore, preferred. The acid chlorides are the most preferred of the acid halides.

Representative acid halides which are particularly useful in the production of acid adjusted undistilled phosgenation product are acetyl chloride, benzoyl chloride, hydrogen chloride, hydrogen bromide, hydrogen iodide, phosgene, carbonyl bromide, acetyl chloride, phthaloyl chloride, isophthaloyl chloride, terephthaloyl chloride, succinoyl chloride, trimesoyl chloride, and adipyl bromide. The most preferred acid halides for the acid adjustment of the instant invention are hydrogen chloride, phosgene, and isophthaloyl chloride.

In more detail, the instant invention relates in part to a method for producing an improved undistilled tolylene diamine phosgenation product which has an amine equivalent of about 90–125 and an acidity of about 0.03–0.3 weight percent. The use of such an improved undistilled tolylene diamine phosgenation product as an element of a polyurethane foam which has high resilience and good compression set, is also intended to be within the scope of the instant invention.

The tolylene diamine which is converted to the undistilled tolylene diamine phosgenation product of the instant invention need not be completely pure. For instance, it can contain by-products from the hydrogenation of dinitro tolylene. Preferably, the diamine should be free of orthodiamine isomers. The ratio of the various isomers in the phosgenation product can of course be controlled by using diamine which will produce the desired isomers. In addition, the particular diisocyanate isomers desired may be added. Physical separations such as fractional crystallization or distillation can be used to control the isomer ratio. Crude tolylene diisocyanate having at least 50% 2,4-isomer up to and including 100% 2,4-isomer can be used in this invention. The 2,4-/2,6-isomer ratio is determined by infrared analysis following the procedures of ASTM D–1638. It is noted that crude diisocyanates which have 65–75% of the 2,4-isomer are preferred for producing a polyurethane foam having good load-bearing properties.

Initially, a conventionally obtained tolylene diamine is subjected to any of several well-known phosgenation techniques. Typical of such techniques is the Beck process which is described in U.S. Pat. 2,822,373, additionally, phosgenation processes such as that taught in the Latourette et al. process U.S. Pat. 2,908,703 and the Ewald process U.S. Pat. 3,321,283 are also applicable. In general, phosgenation requires the mixing and heating of a primary diamine and phosgene together with an inert solvent, such as orthodichlorobenzene, until the diamine is substantially all phosgenated. That is to say, practically all of the diamines are converted to diisocyanate or complex by-products. Some minor amount of amine in the form of the hydrochloride, e.g. 0.1 to about 10 weight percent which has not been converted, and some impurities may be present. The crude undistilled diisocyanate is a complex mixture consisting of about 80 to 95 weight percent of diisocyanate containing dissolved phosgenation by-products, such as biurets, carbodiimides, trimerized and dimerized diisocyanates.

Phosgenation atmosphere as the term is used herein refers to phosgene in contact with the crude polyamine, polyisocyanate, or mixtures thereof. The phosgene is preferably mixed with the crude by bubbling phosgene gas through the crude or adding the phosgene gas directly to the crude and agitating so that the phosgene dissolves within it. As phosgene reacts with amine and impurities, various by-products such as HCl accumulate in the crude. The phosgenation atmosphere can include volatile impurities with the phosgene and solvent as well as by-products. Solvent and by-products can be removed from the phosgenated amine prior to the acidity adjustment if desired.

The phosgenation process continues until substantially all the diamine has been converted to tolylene diisocyanate and phosgenation by-products. There is at this time less than 10% by weight of diamine hydrochloride present. According to the process of this invention the acidity of the undistilled product is altered so that the resulting undistilled tolylene diamine phosgenation product has an adjusted acidity of about 0.03–0.30 weight percent. The amine equivalent of the phosgenation product is about 90 to 125 which is substantially identical to the amine equivalent of the unaltered phosgenation product. As mentioned previously, several methods may be used to alter the acidity into the desired range; however, the much preferred method is the "natural method." The acidity referred to throughout the specification is determined by the method of ASTM D–1638–67T. This involves reacting the diisocyanate with excess n-propanol and titrating potentiometrically for acidic component with methanolic potassium hydroxide.

Amine equivalent expresses the stoichiometric amine equivalence of undistilled diisocyanate. It is determined by the modification of the assay method of ASTM D–1638 described in U.S. Pat. 3,215,652 to Kaplan.

The figure is a schematic representation of the preferred method for preparing the undistilled tolylene diamine phosgenation product and then adjusting its acidity into the range of about 0.03–0.3 weight percent, by means of the "natural method."

Turning to the figure, m-tolylene diamine is dissolved in solvent and passed through line 1; a phosgene stream is passed through line 2. They are blended in recirculation stream 3 and introduced into the phosgenator-separator 4. Phosgenated liquid phase is withdrawn from the bottom of the separator 4; a major portion thereof is recirculated as stream 3 and a minor portion 5 having an acidity of 0–0.02 weight percent is withdrawn for the subsequent acidity adjustment process. In the phosgenation process gaseous material is withdrawn as stream 6, condensable material is liquified in condenser 7 and returned to the phosgenation as stream 8. Lighter gases, such as phosgene, hydrogen chloride, and other by-products are taken off as stream 9 and reuseable materials such as phosgene can be recycled to the process.

In the acidity adjustment process substantially phosgenated tolylene diamine or crude tolylene diisocyanate, stream 5, is blended into recirculating stream 11 which is passed through heater 12 and then introduced into vessel 13. In vessel 13 heated undistilled diisocyanate is held in contact with phosgene at about 100–200° C. for at least 0.08 hour preferably 0.08 to 2 hours and most preferably 0.08 to 1 hour. The phosgene can be supplied from the undistilled diisocyanate leaving the phosgenation process, but more phosgene can be added if desired as stream 10. A mixture of phosgene and HCl gas can also be added as stream 10 if desired. Liquid undistilled diisocyanate is continuously withdrawn from the vessel 13, and recirculated through the heater and back to the vessel. A minor portion of this liquid is withdrawn as stream 14 when the acidity is at least 0.03% by weight on a solvent-free basis; the amine equivalent of the stream is about 90–125. Gaseous materials are withdrawn as stream 15; condensable material, solvent containing some phosgene, is liquified in condenser 16 and returned to the vessel as stream 17. Waste gases, are withdrawn as stream 18, phosgene can be removed from such waste gases and recycled to the process.

The undistilled tolylene diamine phosgenation product having a 0.03 to 0.3 weight percent acidity on a solvent free basis and 90–125 amine equivalent is effectively utilized as an element in a polyurethane foam having outstanding compression set characteristics at high deflection.

The solvent used in the phosgenation process must be removed from the crude diisocyanate prior to use in foam production. Fractional distillation under vacuum is typically used to remove solvent and also be used to recover a portion of the diisocyanate as relatively pure diisocyanate leaving the complex by-products and some diisocyanate as the residue or still tar. For this invention the solvent can be removed before or after the acidity adjustment process or just prior to use of the crude diisocyanate for foam production and it is not necessary to distill tolylene diisocyanate from the crude diisocyanate. When the acidity is adjusted by the natural process, adjustment is preferably made before solvent removal. The reverse is true in the case of the halide process. The crude diisocyanate can be partially distilled to remove diisocyanate and increase the amine equivalent or relatively pure diisocyanate can be added to decrease the amine equivalent and mixtures of diisocyanates can be used to give particular amine equivalents, isomer ratios, and foam properties. The addition of distilled toluene diisocyanate increases the resistance to humid aging of foams prepared therefrom. Distilled tolylene diisocyanate can be added in amounts up to about 80% by weight of the composition. The amine equivalent can also be increased by adding still tar (normally obtained in the preparation of refined tolylene diisocyanate) to the crude diisocyanate. Crude tolylene diisocyanate used for this invention contains at least a portion of the by-product residue.

The foam process which is improved by the present invention comprises rapidly mixing and reacting undistilled tolylene diamine phosgenation product having an amine equivalent of about 90–125; with (1) a polymeric polyol having a number average molecular weight in the range of about 3000–8000;
(2) up to about 20% by weight based on (1) of a cross-linking agent or chain extender selected from polyamine, low molecular weight polyol, and aminoalcohol; and
(3) up to about 5 parts per hundred parts of (2) of water;

in the presence of an effective amount of a catalyst. The improvement is characterized in that said undistilled tolylene diamine phosgenation product consists essentially of undistilled phosgenation product having an acidity in the range of about 0.03–0.30 weight percent.

Methods of producing polyurethane foams which can be used for this invention are known in the art. Such methods are described in U.S. Pats. 3,471,417 to Dickert; 3,471,418 to Dickert; and copending application Ser. No. 801,148, filed Feb. 20, 1969, now Pat. No. 3,644,235, and Ser. No. 4,062, filed Jan. 19, 1970, now abandoned. The crude diisocyanate of this invention is not restricted to use with these processes. It can also be used advantageously for rigid foam products. Foam can be prepared by one-shot, quasi-prepolymer, or prepolymer methods. To simplify preparation, certain foam components can be mixed into masterbatches prior to foaming as is known in the art. The process is suitable for molded foams or slab stock.

Polyalkylene ether polyols which can be used to produce polyurethane foams of this invention are well known in the art. Such polyols are described in the U.S. patents cited herein as describing foam production methods. Polyols useful for this invention have a number average molecular weight of about 3000–8000 and preferably 4500–7000.

The preferred polyalkylene ether polyols may be a triol, a mixture thereof with a diol, and can also contain minor amounts of higher (higher than 3) functionality polyols. Polyols having a functionality of about three are preferred. These polyalkylene ether polyols can be condensation products of propylene oxide with low molecular weight diol or triol initiators such as ethylene glycol, propylene glycol, diethylene glycol, glycerine, trimethylolpropane, and 1,2,6-hexanetriol; modified polyols are, however, preferred. These are prepared by condensing mixtures of ethylene and propylene oxide with suitable diol or triol initiators such as those described above or by sequential condensation of propylene and ethylene oxides. Capped or tipped triols (prepared by sequential condensation of propylene oxide followed by ethylene oxide) of the above preferred classes are especially useful for producing the foams of this invention.

Cross-linking agents which can be used in preparing the foam of this invention are known in the art. Up to 20 parts of cross-linking agent per hundred parts of polyalkylene ether polyol (hereinafter phr.) can be used for producing the foams of this invention.

Preferred cross-linking agents include (1) aromatic diamines and polyamines such as 4,4'-methylene bis(o-chloroaniline), methylene dianiline, m-tolylene diamine, m-phenylene diamine, 3,3-dichlorobenzidine, 1,5-diaminonaphthalene, and condensation products of aniline or mixtures of aniline and o-chloroaniline with formaldehyde having functionalities greater than two as disclosed in U.S. Pats. 2,683,730 to Seeger et al. and 3,563,906 to Hoeschele; (2) low molecular weight polyols containing tertiary amine nitrogens such as triethanolamine, methyldiethanolamine, N,N,N',N' - tetrakis(2 - hydroxypropyl) ethylene diamine; and (3) low molecular weight polyols containing only C, H, and O, such as glycerol, trimethylolpropane, sorbitol, diethylene glycol, pentaerythritol, 1,2,6-hexanetriol, butanediol-1,4, dipropylene glycol, and ethylene glycol. The aromatic diamines and polyamine are normally used in concentrations of about 1–10 phr. and preferably 2.5–8 phr. The low molecular weight polyols containing tertiary amine nitrogen are usually used in amounts up to 12 phr. and preferably 2–6 phr. Polyols containing C, H, and O are used in amounts up to 20 phr. Foam can be produced using the crude diisocyanate of this invention without a cross-linking agent; but cross-linking agent is preferred.

Any of the catalysts generally used for preparation of polyurethane foams can be used for this invention. These catalysts include tin compounds such as stannous salts of organic acids and organo-tin compounds, tertiary amines such as bis(dimethylaminoethyl)ether, triethylene diamine, N-ethyl morpholine and trimethyl piperazine, and urea. Other suitable catalysts include lead salts, iron salts, chelates of transition metals, substituted guanidines and amidines, urea, and urea derivatives. Combinations of these catalysts can be used. The amount of catalyst depends upon the foam formation rate desired. Generally, more catalyst is required when using crude diisocyanate having a higher acidity. The concentration of catalyst can be readily determined for a particular foam system and the reaction rate desired.

Blowing agents and methods for using them which can be used for producing foam of this invention are well known in the art. Generally, water is required for producing flexible foam with acceptable hardness and elastomeric properties. Other blowing agents such as fluorocarbon and methylene chloride can be used with water to reduce hardness or to obtain very low density. Generally, up to 5 phr. water can be used for acceptable properties and preferably 2–3.5 phr. water for a foam density of 2–4 lbs. per cubic foot (lb./ft.$^3$).

No surfactant is required to produce the foams of this invention. Minor amounts of selected surfactants are, however, generally desirable to produce slab or molded foam without excessive waste and with high quality surface texture. The preferred surfactant to be used is polydimethyl siloxane oil, 5 centistoke grade. Up to 0.5 phr. of this surfactant can be used and preferably 0.01–0.03 phr. Other silicone oils can be used in minor amounts and poly(dimethylsiloxane)-poly-(oxyalkylene) block copolymers can also be used. Excessive amounts of surfactant may reduce flame resistance.

Other additives such as pigments, stabilizers, fillers, and flame retardants can be used for the foam of this invention to change particular properties such as density, color, unit cost, load-bearing ability, sag factor, flammability, etc. The use of such additives is well known in the art.

The standard test methods of ASTM D–1564 are used to characterize the foams of this invention. Compression set is expressed in terms of percentage of the original deflection. Sag factor is obtained by dividing the indent load at 65% deflection by the indent load at 25% deflection.

The following examples illustrate the invention. Parts, percentages, and ratios are by weight unless otherwise indicated. All of the foams prepared in the following examples are self-extinguishing by ASTM D–1692.

EXAMPLES

Polyisocyanate A

Crude tolylene diisocyanate is prepared in the phosgenation equipment as represented in the drawing. A solution of 37.6 parts of m-tolylene diamine (80% 2,4-isomer; 20% 2,6-isomer) in 385 parts of o-dichlorobenzene is fed continuously as stream 1 at a rate of 422.6 parts per hour. Phosgene is introduced as a liquid as stream 2 at a rate of 122 parts per hour. Reaction mass is recirculated from separator 4 through conduit 3 at a rate of about 34,000 parts per hour. The temperature of the liquid in separator 4 is maintained at about 150° C. Crude tolylene diisocyanate dissolved in o-dichlorobenzene is removed through conduit 5 at a rate sufficient to maintain a constant liquid level in separator 4. The flow in conduit 5 is about 1.3% of the flow in conduit 3. The total weight of phosgenation reaction mass contained in the equipment is about 230 parts.

To prepare a prior art crude, material leaving through conduit 10 is freed of gaseous by-products (mainly HCl and phosgene) by passage through a falling film evaporator (not shown in the drawing) operated at around 180° C. so that about 10% of the solvent is removed by distillation. This insures the removal of HCl and phosgene. The degassed crude is then fractionally distilled to remove o-dichlorobenzene. The bottoms of this distillation is crude tolylene diisocyanate having an amine equivalent of about 92–100 and an acidity of about 0.01–0.02%.

Polyisocyanate B

Phosgenation of m-tolylene diamine is conducted by the same procedure described for polyisocyanate A up to the point where phosgenation mass is removed through conduit 5. Material from conduit 5 is introduced into recirculation loop 11. The temperature in loop 11 and vessel 13 is maintained at about 170° C., by heater 12. The volume of material contained in vessel 13 is maintained at a level to give an average hold-up time of 60 minutes. No additional phosgene or HCl is added through conduit 10. The phosgene required to carry out the natural adjustment of acidity is supplied by the phosgene dissolved in stream 5. Rapid loss of phosgene from the vessel is prevented by condenser 16 which returns o-dichlorobenzene containing dissolved phosgene to the vessel. Material from the vessel is continuously removed through conduit 14 and then degassed and fractionally distilled to remove solvent as described for the preparation of polyisocyanate A. The resulting crude tolylene diisocyanate has an amine equivalent of 92–100 and an acidity of 0.06–0.08%.

Example 1

A high resilience foam is prepared by continuously mixing the following mixtures as separate streams in a commercially available foam machine.

Stream 1 (temperature ~43° C.):

| | Parts |
|---|---|
| Polyisocyanate B | 38.2 |
| Tris(2,3-dibromopropyl)phosphate | 3.0 |

Stream 2 (temperature ~43° C.):

| | |
|---|---|
| Polyoxypropylene ether triol based on trimethylpropane, capped with ethylene oxide, ratio of ethylene oxide/propylene oxide 12/88 to 15/85, number average molecular weight about 4700 | 100.0 |
| Triethanol amine | 2.0 |
| Cumene diamine | .52 |
| m-Phenylene diamine | .48 |
| Water | 2.5 |
| Polydimethylsiloxane oil—5 centistoke grade | 0.04 |
| Triethylene diamine | 0.8 |
| Paraffinic hydrocarbon oil, average molecular weight about 350; viscosity SUS at 100° F., 100–110 | 1.0 |

Material leaving the foam mixing machine is introduced into a 15" x 15" x 4½" aluminum mold and the mold is closed so that foaming takes place under the pressure developed during foaming. The foam is removed from the mold after 8–10 minutes and passed through rolls to break any closed cells. The foam is then cured for 30 minutes at 120° C. and conditioned for 3 days at about 25° C. prior to testing. Substantially the same results are obtained if the curing step is omitted and the foam is conditioned for 7 days at 25° C. before testing.

Following essentially the same procedure, a control foam is prepared by replacing polyisocyanate B with polyisocyanate A.

The results of physical tests for the foam of this example and the control are shown below.

| | Foam of this example | Control |
|---|---|---|
| Density, lb./cu. ft. | 2.7 | 2.6 |
| Tensile at break, p.s.i. | 17.9 | 17.5 |
| Elongation at break, percent | 190 | 190 |
| Compression set at 75% (deflection, 22 hrs. at 70° C.), percent | 16 | 85 |

It can be seen that compression set is improved very significantly while other foam properties remain unchanged.

Example 2

Using the procedure for foam preparation described in Example 1 foam is prepared from the following formulation.

Stream 1 (temperature ~30° C.):

| | Parts |
|---|---|
| Polyisocyanate B | 38.6 |

Stream 2 (temperature ~43° C.):

| | |
|---|---|
| Polyoxypropylene ether triol of Example 1 | 100.0 |
| Polyamine prepared by condensing aniline and o-chloroaniline with formaldehyde as described in Example 6 of U.S. Pat. 3,563,906 | 3.5 |
| Water | 2.7 |
| Polydimethylsiloxane oil, centistoke grade | 0.025 |
| Triethylene diamine (33% solution in dipropylene glycol) | 0.7 |
| N-ethyl morpholine | 0.3 |
| Paraffinic hydrocarbon oil average molecular weight about 350; viscosity SUS at 100° F., 100–110 | 1.0 |

A control foam is prepared using the same formulation with the exception that polyisocyanate A is used in place of polyisocyanate B.

Properties of the foam of this example and the control foam are tabulated in the following table:

|  | Foam of this example | Control |
|---|---|---|
| Density, lb./cu. ft. | 2.7 | 2.7 |
| Tensile at break, p.s.i. | 17 | 19 |
| Elongation at break, percent | 156 | 170 |
| Indent load deflection, lb./50 in.²: | | |
| 25% deflection | 23 | 22 |
| 65% deflection | 67 | 60 |
| Sag factor | 2.9 | 2.7 |
| Compression set, 22 hrs./70° C., percent: | | |
| 50% compression | 8 | 14 |
| 75% compression | 6 | 88 |
| 90% compression | 15 | >90 |

The data show that the improved foam and control foam are substantially identical in properties except for the outstanding improvement in compression set exhibited by the foam of this invention.

Example 3

Phosgene is passed over the surface of 616 parts of polyisocyanate A contained in an agitated reaction vessel at 160° C. until there is an increase in weight of 3.3 parts. The phosgene-treated polyisocyanate A is then mixed with 1244 parts of untreated polyisocyanate A. The polyisocyanate mixture has an amine equivalent of 100 and an acidity of 0.09%.

Using the procedure of Example 1 and the formulation of Example 2, a high resilience foam is prepared from the polyisocyanate mixture described above. Properties of the resulting foam are tabulated in the following table. Properties for the control foam of Example 2 are repeated in the table for convenience.

|  | Foam of this example | Control |
|---|---|---|
| Density, lb./cu. ft. | 2.7 | 2.7 |
| Tensile at break, p.s.i. | 19 | 19 |
| Elongation at break, percent | 183 | 170 |
| Indent load deflection, lb./50 in.²: | | |
| 25% deflection | 27 | 22 |
| 65% deflection | 84 | 60 |
| Sag factor | 3.1 | 2.7 |
| Compression set, 22 hrs./70° C., percent: | | |
| 50% compression | 11 | 14 |
| 75% compression | 24 | 88 |

The properties of the two foams are quite similar except for a substantial improvement in 75% compression set for the foam of this invention.

Example 4

A mixture of 5 parts of isophthaloyl chloride and 150 parts of polyisocyanate A is agitated at 120° C. for 3 hours. The mixture is then added to and mixed with about 1350 parts of untreated polyisocyanate A. The resulting adjusted crude has an amine equivalent of 100 and an acidity of 0.09%.

Foam is prepared by the procedure of Example 1 using the formulation of Example 2 with the exception that the adjusted crude polyisocyanate of this example is used.

Foam properties along with those of the control foam of Example 2 are tabulated below.

|  | Foam of this example | Control |
|---|---|---|
| Density, lb./cu. ft. | 2.8 | 2.7 |
| Tensile at break, p.s.i. | 18 | 19 |
| Elongation at break, percent | 163 | 170 |
| Indent load deflection, lb./50 in.²: | | |
| 25% deflection | 23 | 22 |
| 65% deflection | 70 | 60 |
| Sag factor | 3.0 | 2.7 |
| Compression set, 22 hrs./70° C., percent: | | |
| 50% compression | 9 | 14 |
| 75% compression | 9 | 88 |

Substantially the same results are obtained if the mixture of isophthaloyl chloride and polyisocyanate A are used without heating at 120° C.

Example 5

To 100 parts of polyisocyanate A is added 0.18 part of benzoyl chloride. The adjusted crude diisocyanate has an acidity of about 0.10%.

Foam is prepared from this diisocyanate using the procedure of Example 1 and the formulation of Example 2. A control foam is also prepared from an unadjusted sample of polyisocyanate A.

The properties of the two foams are tabulated below.

|  | Foam of this example | Control |
|---|---|---|
| Density, lb./cu. ft. | 2.6 | 2.6 |
| Tensile at break, p.s.i. | 20 | 20 |
| Elongation at break, percent | 140 | 160 |
| Compression set, 22 hrs./70° C., percent: | | |
| 50% compression | 12 | 12 |
| 75% compression | 12 | 75 |

Again the properties of the two foams are quite similar except for the outstanding improvement in compression set of the foam of this invention.

Example 6

A sample of 2194 parts of polyisocyanate B (amine equivalent 92.3, acidity, 0.074) is heated to 154° C. and maintained at that temperature for about 10 minutes. While maintaining the temperature at 150–154° C., 76 parts of phosgene is passed into the polyisocyanate over a two-hour period. The sample is then vacuum sparged with nitrogen for about 10 hours while the temperature is maintained at 150° C. The resulting crude polyisocyanate has an amine equivalent of 95 and an acidity of 0.163.

Foam is prepared from the adjusted polyisocyanate by using the procedure of Example 1 and the formulation of Example 2 with the exception that the paraffinic hydrocarbon oil is omitted and the amounts of triethylene diamine (33% solution in dipropylene glycol) and N-ethyl morpholine are increased from 0.7 to 1.0 part and from 0.3 to 0.5 part respectively. The increased amounts of tertiary amine catalysts are required to compensate for the acidity of the adjusted polyisocyanate. The properties of the foam are listed below.

Density, lb./cu. ft. _____ 2.6
Tensile at break, p.s.i. _____ 18
Elongation at break, percent _____ 176
Indent load deflection, lb./50 in.²:
    25% deflection _____ 21
    65% deflection _____ 63
Sag factor _____ 3.0
Compression set, 22 hrs./70° C., percent:
    75% compression _____ 3
    90% compression _____ 11

We claim:

1. In a process for producing a flexible polyurethane foam having improved compression set comprising mixing and reacting
    undistilled tolylene diamine phosgenation product having an amine equivalent of about 90–125; with
        (1) a polymeric polyol having a number average molecular weight in the range of about 3000–8000;
        (2) up to 20% by weight based on (1) of a cross-linking agent or chain extender selected from polyamine, polyol, and aminoalcohol; and
        (3) up to 5 parts per hundred parts of (1) of water;
in the presence of an effective amount of a catalyst, the improvement characterized in that said undistilled tolylene diamine phosgenation product consists essentially of an undistilled tolylene diamine phosgenation product having an acidity in the range of about 0.03 to 0.30 weight percent, said range having been attained by contacting said phosgenation product with a phosgenation atmosphere at a temperature of about 100–200° C. for at least about 0.08 hour.

2. The process of claim 1 wherein said polyol is a polyalkylene ether polyol.

3. The process of claim 1 wherein said catalyst is a tin containing catalyst.

References Cited
UNITED STATES PATENTS

| | | | |
|---|---|---|---|
| 3,644,235 | 2/1972 | Gray | 260—2.5 |
| 3,471,417 | 10/1969 | Dickert | 260—2.5 |
| 3,471,418 | 10/1969 | Dickert et al. | 260—2.5 |
| 3,073,802 | 1/1963 | Windemuth | 260—2.5 |
| 2,620,349 | 12/1952 | Slocombe | 260—2.5 |

OTHER REFERENCES

Allied Chem. Tecnical Data on "Nacconate 4040."
Allied Chem. Corp. Research Notes RN17; 1963.
Polyurethanes Chemistry and Technology, by Saunders and Frisch; p. 861; Interscience Publishers, New York; 1964.

DONALD E. CZAJA, Primary Examiner

E. C. RZUCIDLO, Assistant Examiner

U.S. Cl. X.R.

260—2.5 AB, 453 AR, 453 PH